(12) United States Patent
Uchiyama et al.

(10) Patent No.: US 8,011,487 B2
(45) Date of Patent: Sep. 6, 2011

(54) CLUTCH OUTER MEMBER FOR MULTI-PLATE CLUTCH

(75) Inventors: Yoshimichi Uchiyama, Shizuoka (JP); Tomoyasu Satou, Shizuoka (JP); Norihiro Sugita, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 348 days.

(21) Appl. No.: 12/184,158

(22) Filed: Jul. 31, 2008

(65) Prior Publication Data

US 2008/0296119 A1 Dec. 4, 2008

Related U.S. Application Data

(63) Continuation of application No. PCT/JP2006/318692, filed on Sep. 21, 2006.

(30) Foreign Application Priority Data

Apr. 18, 2006 (JP) .................................. 2006-114671

(51) Int. Cl.
F16D 13/60 (2006.01)
(52) U.S. Cl. .................. 192/70.2; 192/30 W; 192/89.26
(58) Field of Classification Search .......................... None
See application file for complete search history.

(56) References Cited

U.S. PATENT DOCUMENTS

| 1,742,805 | A | * | 1/1930 | Carhart | 192/70.12 |
| 5,305,943 | A | * | 4/1994 | Walker | 228/176 |
| 5,642,958 | A | * | 7/1997 | Sugiyama | 403/359.6 |
| 6,523,663 | B2 | * | 2/2003 | Murata | 192/70.2 |
| 2004/0055845 | A1 | * | 3/2004 | Friedrich et al. | 192/70.2 |
| 2008/0067023 | A1 | * | 3/2008 | Sahyoun et al. | 192/21.5 |

FOREIGN PATENT DOCUMENTS

| JP | 56-18426 | | 2/1981 |
| JP | 1-250623 | A | 10/1989 |
| JP | 04-272516 | A | 9/1992 |
| JP | 11-63014 | A | 3/1999 |
| JP | 2005-257032 | A | 9/2005 |

* cited by examiner

*Primary Examiner* — David D Le
*Assistant Examiner* — Jacob S Scott
(74) *Attorney, Agent, or Firm* — Arent Fox, LLP

(57) ABSTRACT

A clutch outer member (1) for a multi-plate clutch is provided that includes an end wall (7), a large number of fins (30) extending axially from the outer peripheral part of the end wall (7) and arranged at equal intervals in the peripheral direction so as to define spline grooves (20B) therebetween, and an annular connecting part (31) formed on the outer periphery at the extremity of this group of fins (30) and connecting the fins (30) integrally to each other, the fin (30) having an axially-extending weight-cutting bottomed groove (33) formed, wherein the annular connecting part (31) is provided, on a part of its outer end face corresponding to each of the spline grooves (20B), with a reference notch (32) indicating the position of the spline groove (20B), and spline teeth (20A) of a friction plate (3) are fitted into the spline grooves (20B) corresponding to the reference notches (32). This enables differentiation between the weight-cutting bottomed groove and the spline groove of the clutch outer member to be carried out quickly and appropriately and an operation of fitting the spline teeth of the friction plate into the spline grooves to be carried out quickly.

7 Claims, 6 Drawing Sheets

US 8,011,487 B2

CLUTCH OUTER MEMBER FOR MULTI-PLATE CLUTCH

CROSS-REFERENCE TO RELATED APPLICATIONS

This application is a Continuation of International Application No. PCT/JP2006/318692, filed Sep. 21, 2006, which claims Priority to Japanese Application No. 2006-114671, filed Apr. 18, 2006.

TECHNICAL FIELD

The present invention relates to an improvement of a clutch outer member for a multi-plate clutch, the clutch outer member including an end wall, a large number of fins extending axially from an outer peripheral part of the end wall and arranged at equal intervals in the peripheral direction so as to define spline grooves therebetween, and an annular connecting part formed on the outer periphery at the extremity of this group of fins and connecting the fins integrally to each other, the fin having an axially-extending weight-reducing bottomed groove formed so as to open on an inner peripheral face thereof.

BACKGROUND ART

Such a clutch outer member for a multi-plate clutch is already known, as disclosed in Patent Publication 1 below, in which the annular connecting part suppresses radially outward deformation of each fin due to centrifugal force during high-speed rotation of the clutch and always maintains an appropriate sliding fit between the spline grooves and spline teeth on the outer periphery of a friction plate, thus contributing to operational stability and durability of the clutch.
Patent Publication 1: Japanese Patent Application Laid-open No. 2005-257032

DISCLOSURE OF INVENTION

Problems to be Solved by the Invention

In such a clutch outer member, since the spline grooves and the weight-cutting bottomed grooves are arranged alternately on the extremity face thereof and, moreover, the spline grooves become bottomed in a portion where the annular connecting part is present, when fitting the spline teeth on the outer periphery of the friction plate into the spline grooves of the clutch outer member during a clutch assembly process, there is a possibility that the weight-cutting bottomed grooves might be mistaken for the spline grooves. In general, the weight-cutting bottomed grooves have a smaller groove width than that of the spline grooves and the clutch will not be mis-assembled, but mistakes in differentiating the spline grooves from the weight-cutting bottomed grooves affect the assembly efficiency to some extent.

The present invention has been accomplished under the above-mentioned circumstances, and it is an object thereof to provide a clutch outer member for a multi-plate clutch, the clutch outer member enabling differentiation between a weight-cutting bottomed groove and a spline groove to be carried out quickly and appropriately and an operation of fitting spline teeth of a friction plate into the spline grooves to be carried out quickly, thus contributing to an improvement in the efficiency of assembling the clutch.

Means for Solving the Problems

In order to attain the above object, according to a first aspect of the present invention, there is provided a clutch outer member for a multi-plate clutch, the clutch outer member comprising an end wall, a large number of fins extending axially from the outer peripheral part of the end wall and arranged at equal intervals in the peripheral direction so as to define spline grooves therebetween, and an annular connecting part formed on the outer periphery at the extremity of this group of fins and connecting the fins integrally to each other, the fin having an axially-extending weight-cutting bottomed groove formed so as to open on an inner peripheral face thereof, characterized in that the annular connecting part is provided, on a part of an outer end face thereof corresponding to each of the spline grooves, with a reference notch indicating the position of the spline groove.

According to a second aspect of the present invention, in addition to the first aspect, an inner side face of the reference notch is flush with an inner side face of the corresponding spline groove

Effects of the Invention

In accordance with the first aspect of the present invention, since the reference notches indicating the positions of the spline grooves are provided on the outer end face of the annular connecting part, in a process of assembling the clutch, when fitting spline teeth of a drive friction plate into the spline grooves of the clutch outer member, by adjusting the positions of the spline teeth of the drive friction plate so that they match the reference notch positions, these spline teeth can be fitted into the spline grooves appropriately. It is therefore possible to avoid an erroneous assembly operation due to being misled by the weight-cutting bottomed groove of each fin, thus improving the efficiency of the assembly operation.

In accordance with the second aspect of the present invention, since the reference notch is formed so as to communicate with the corresponding spline groove, some of the spline teeth can be guided to the spline grooves through the reference notches, thus further improving the efficiency of the assembly operation.

EXPLANATION OF REFERENCE NUMERALS AND SYMBOLS

Figure 1:
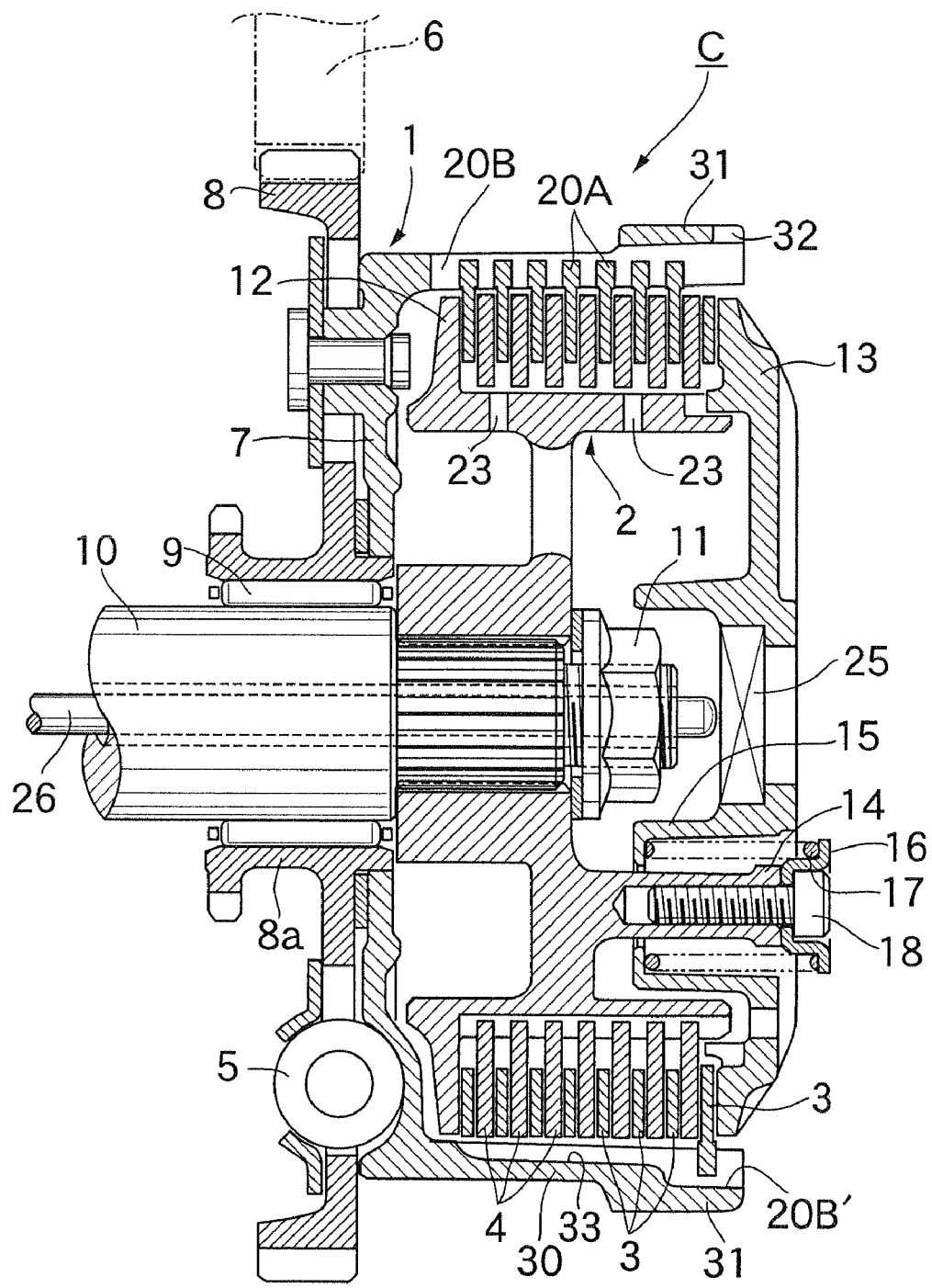
FIG. 1 is a vertical sectional view of a multi-plate clutch equipped with the clutch outer member of the present invention (first embodiment).

C Clutch
1 Clutch outer member
3 Friction plate (drive friction plate)
7 Clutch outer member end wall
20A Friction plate spline tooth
20B Clutch outer member spline groove
30 Fin of clutch outer member
31 Annular connecting part
32 Reference notch
33 Bottomed groove

BEST MODE FOR CARRYING OUT THE INVENTION

A mode for carrying out the present invention is explained below by reference to a preferred embodiment of the present invention shown in the attached drawings.

Embodiment 1

First, in FIG. 1, reference symbol C denotes a multi-plate wet clutch for a two-wheeled motor vehicle. This clutch C includes a clutch outer member 1 having an overall bottomed cylindrical shape, a clutch inner 2 disposed concentrically within the clutch outer member 1, a plurality of drive friction plates 3 axially slidably spline-fitted into the inner periphery of the clutch outer member 1, and a plurality of driven friction plates 4 superimposed alternately on the drive friction plates 3 and axially slidably spline-fitted onto the outer periphery of the clutch inner 2.

An input gear 8, which meshes with an engine drive gear 6, is connected to an end wall 7 of the clutch outer member 1 via a torque damper 5, and the clutch inner 2 is spline-coupled to and secured by a nut 11 to an output shaft 10 supporting a hub 8a of the input gear 8 via a needle bearing 9.

A pressure-receiving plate 12, which faces the drive friction plate 3 on the innermost side, is formed integrally with the inner end of the clutch inner 2. Furthermore, a pressure plate 13, which faces the drive friction plate 3 on the outermost side, is slidably spline-fitted onto the outer end part of the clutch inner 2.

Moreover, a plurality of posts 14 (only one being shown in FIG. 1) are projectingly provided integrally with the clutch inner 2, the posts 14 projecting axially outward, a bottomed cylindrical support tube 15 surrounding the post 14 is formed integrally with the pressure plate 13, and a clutch spring 17 is provided in a compressed state between the base of the support tube 15 and a retainer 16 secured to the extremity of the post 14 by a bolt 18, the clutch spring 17 urging the pressure plate 13 toward the pressure-receiving plate 12 side with a predetermined set load.

Figure 2:
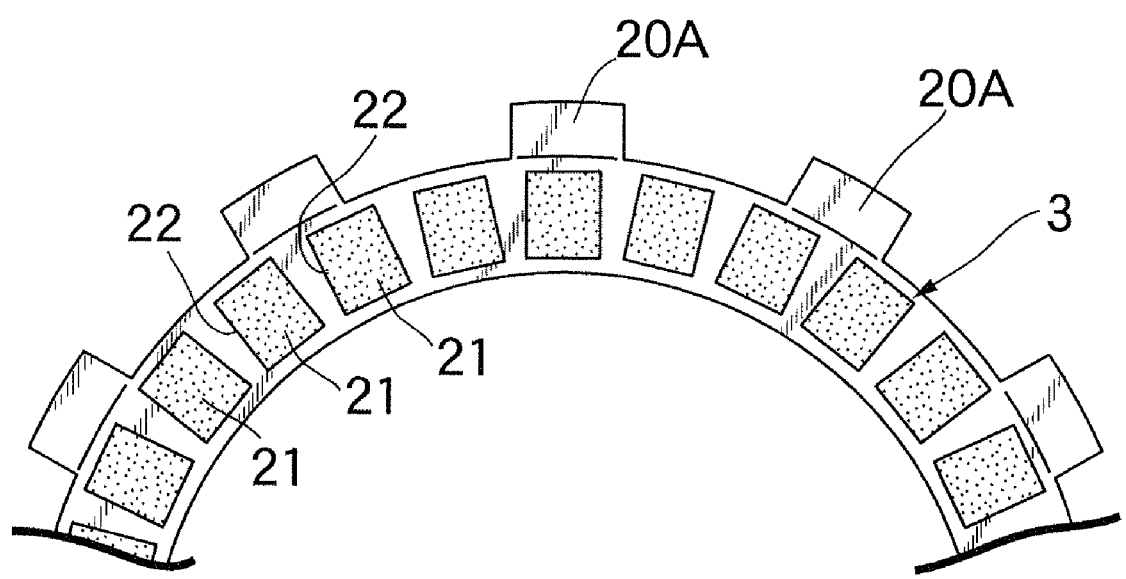
FIG. 2 is a partial plan view of a drive friction plate of the clutch (first embodiment).
Figure 3:
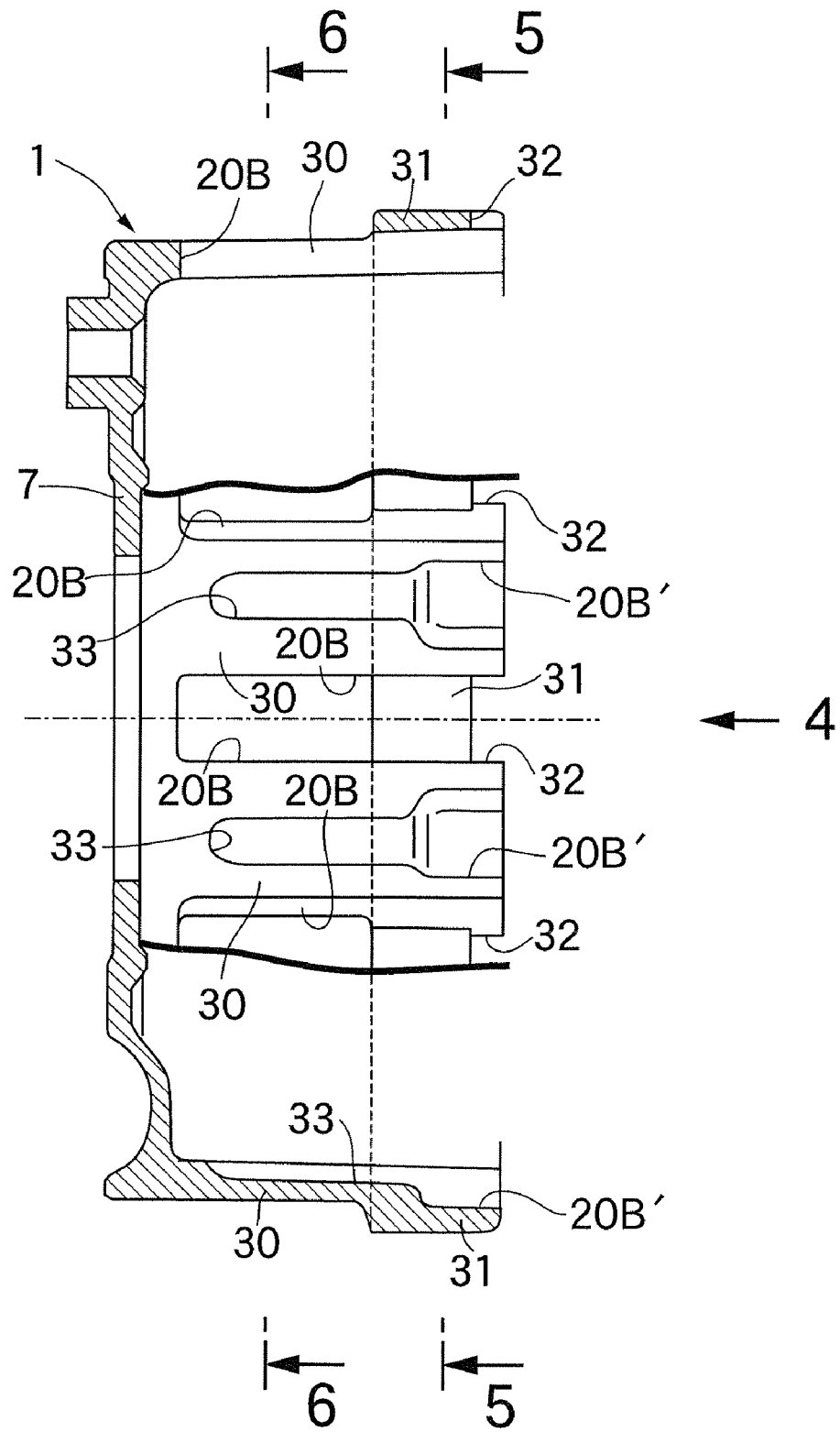
FIG. 3 is a partial vertical sectional view of the clutch outer member on its own (first embodiment).
Figure 4:
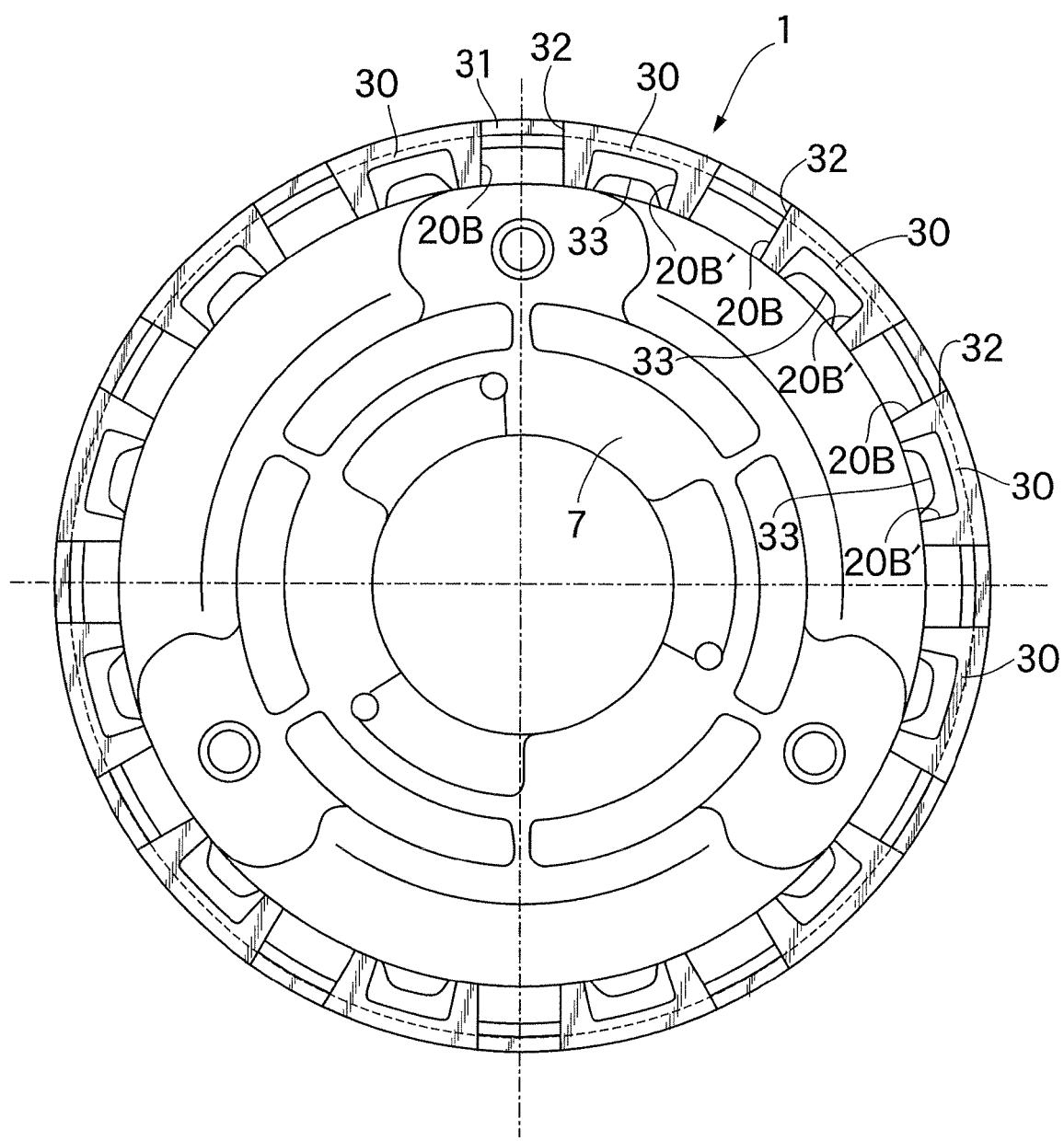
FIG. 4 is a view from arrow 4 in FIG. 3 (first embodiment).
Figure 5:
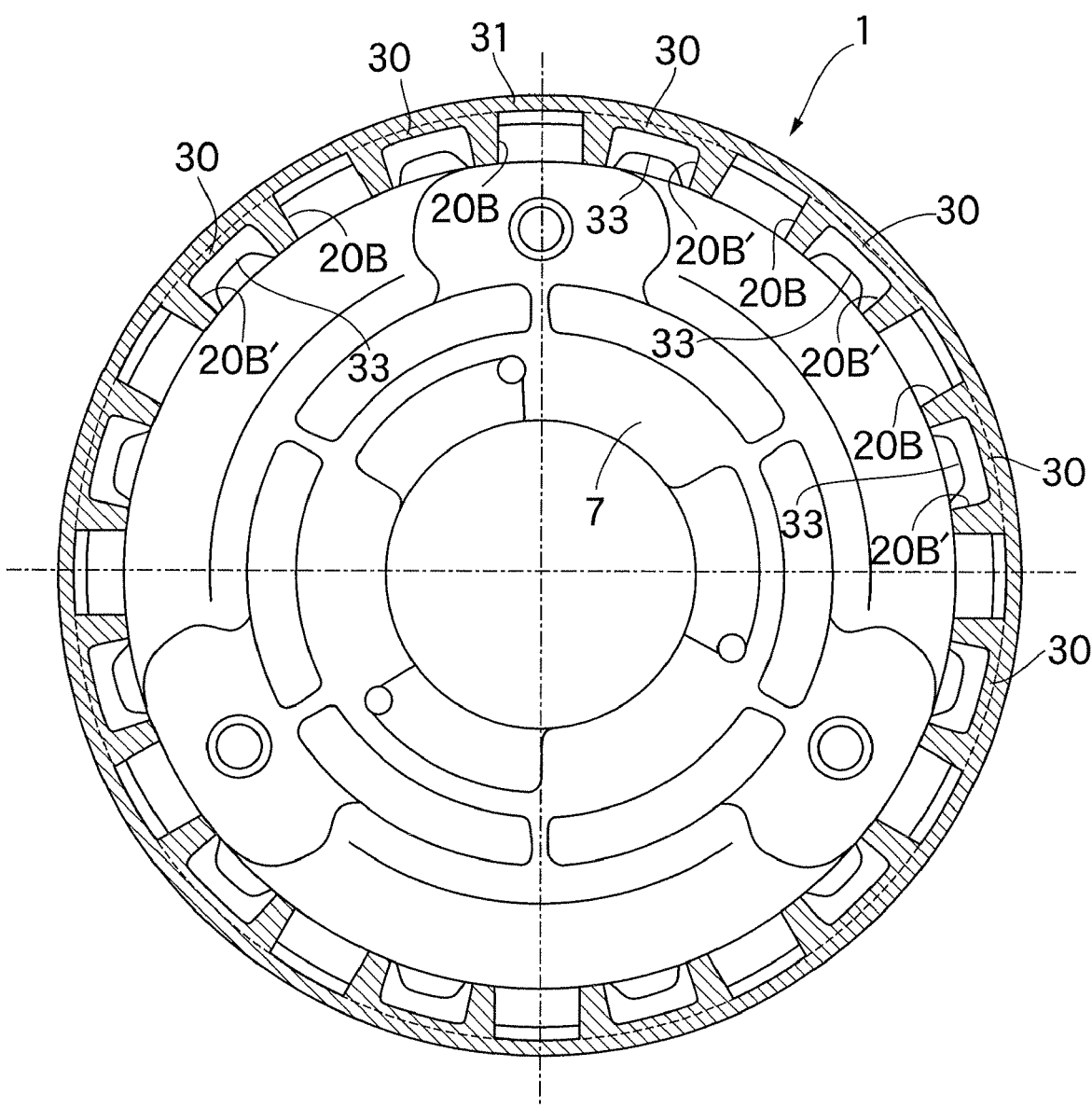
FIG. 5 is a sectional view along line 5-5 in FIG. 3 (first embodiment).
Figure 6:
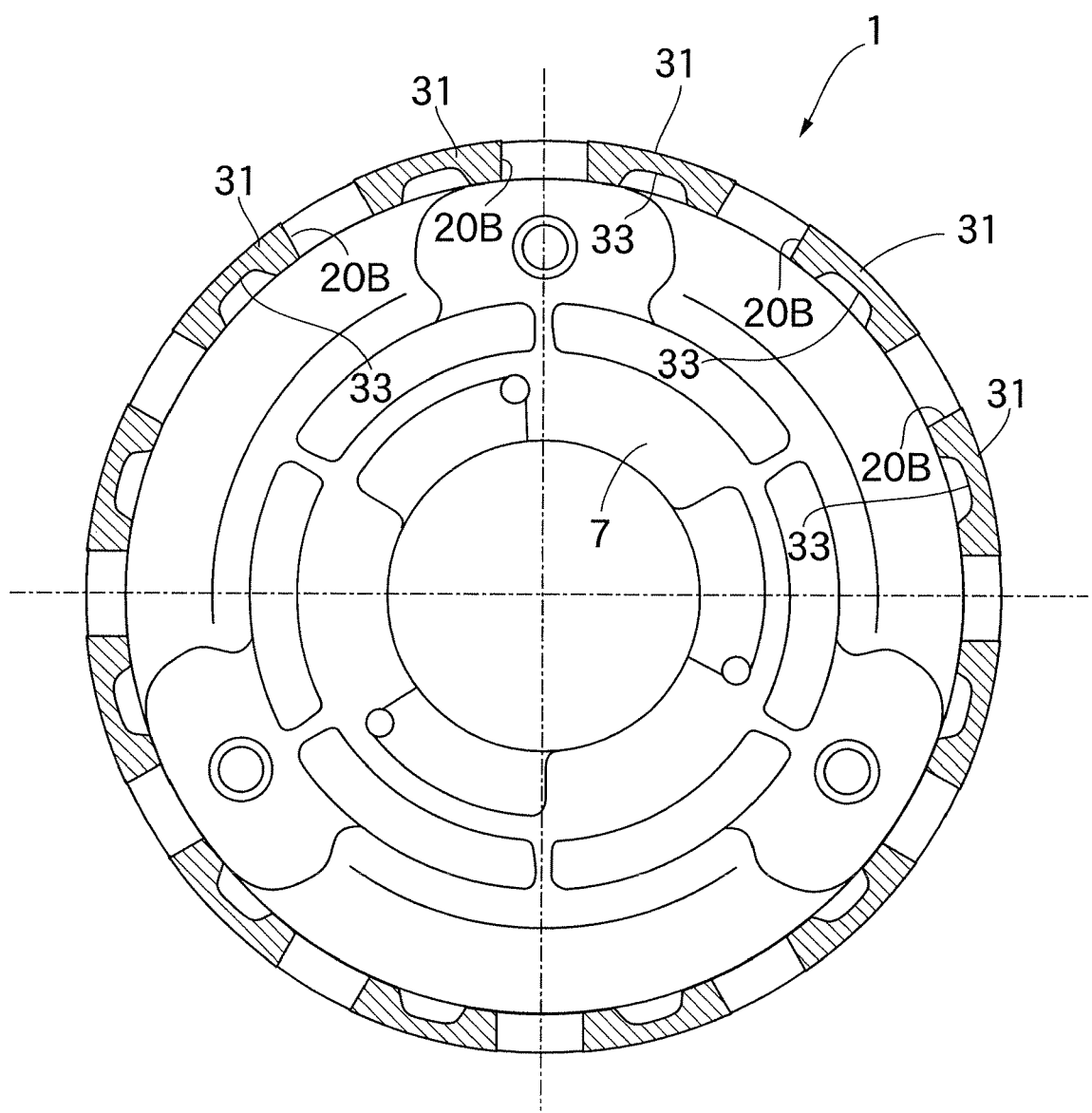
FIG. 6 is a sectional view along line 6-6 in FIG. 3 (first embodiment).

As shown in FIG. 2, a large number of strip-shaped friction linings 21 are bonded to opposite faces of the drive friction plate 3, which has spline teeth 20A on the outer periphery, so as to define radial oil grooves 22 therebetween.

Referring back to FIG. 1, a large number of oil holes 23 are provided in the peripheral wall of the clutch inner 2, the oil holes 23 providing communication between the interior and the exterior of the clutch inner 2.

When the clutch C is in an engaged state, since the pressure plate 13 presses the group of drive and driven friction plates 3 and 4 against the pressure-receiving plate 12 with the set load of the clutch spring 17, thus providing frictional engagement between the drive friction plates 3 slidably spline-fitted into the clutch outer member 1 and the driven friction plates 4 slidably spline-fitted onto the clutch inner 2, power transmitted from the drive gear 6 to the input gear 8 can be transmitted from the clutch outer member 1 to the clutch inner 2 and the output shaft 10 via the group of drive and driven friction plates 3 and 4.

The output shaft 10 is formed so as to be hollow, and a push rod 26 is disposed in the hollow part, the push rod 26 having its extremity abutting against a central area of the pressure plate 13 via a release bearing 25. This push rod 26 is operable in association with a clutch operation lever (not illustrated).

When the push rod 26 moves forward as a result of the operation of the clutch operation lever, the push rod 26 pushes the pressure plate 13 against the set load of the clutch spring 17 in the opposite direction to the pressure-receiving plate 12 so as to detach it from the group of drive and driven friction plates 3 and 4, as a result the drive and driven friction plates 3 and 4 are freed from frictional engagement, and the transmission of power from the clutch outer member 1 to the clutch inner 2 can therefore be cut off.

The clutch outer member 1 of the present invention is explained in detail by reference to FIG. 3 to FIG. 6.

The clutch outer member 1 is produced by die-casting using an Al alloy as a material. It is formed from the end wall 7, a large number of fins 30 extending axially from an outer peripheral part of the end wall 7, and an annular connecting part 31 formed on the outer periphery of extremities of these fins 30 and connecting the fins 30 integrally to each other, and it has an overall bottomed cylindrical shape. The large number of fins 30 are arranged at equal intervals in the peripheral direction so as to define spline grooves 20B therebetween, and slidably fitting the spline teeth 20A (see FIG. 2) on the outer periphery of the drive friction plate 3 into the spline grooves 20B achieves a sliding spline fit between the clutch outer member 1 and the drive friction plates 3.

Reference notches 32 are provided on the outer end face of the annular connecting part 31 in parts corresponding to each of the spline grooves 20B, the reference notches 32 indicating the positions of the spline grooves 20B. In this process, the inner face of the reference notch 32 is formed so as to be flush with the inner face of the spline groove 20B.

Furthermore, a weight-cutting bottomed groove 33 is formed in each of the fins 30, the bottomed groove 33 opening on the inner peripheral face side and extending axially, and having a groove width smaller than that of the spline groove 20B.

Furthermore, a bottomed auxiliary spline groove 20B' having a length smaller than the axial width of the annular connecting part 31 is provided so as to open on the extremity face of each of the fins 30 and, among the group of drive and driven friction plates 3 and 4, the spline tooth 20A of the drive friction plate 3 that is on the outermost side and in contact with the pressure plate 13 is slidably fitted into the auxiliary spline groove 20B'.

The operation of this embodiment is now explained.

In the clutch outer member 1, since the large number of spline grooves 20B defined by the large number of fins 30 open toward the inside and toward the outside in portions other than the annular connecting part 31, not only do they contribute to lightening the weight while enabling the spline teeth 20A of the drive friction plate 3 to be fitted thereinto, but it is also possible to promote cooling of the sections under friction between the drive and driven friction plates 3 and 4 by supplying oil to the oil grooves 22 of the drive friction plates 3 through the spline grooves 20B or discharging oil from the oil grooves 22 to the spline grooves 20B. Furthermore, since each of the fins 30 has the weight-cutting bottomed groove 33 formed so as to open on the inner peripheral face side and extend axially, and surplus material is cut away, this further contributes to lightening the weight of the clutch outer member 1.

Moreover, since the rigidity of the large number of fins 30 is reinforced by the annular connecting part 31 integrally connecting the extremities thereof, it is possible to prevent radially outward deformation due to centrifugal force during rotation of the clutch outer member 1, thus always maintaining an appropriate fit between the spline grooves 20B of the clutch outer member 1 and the spline teeth 20A of the drive friction plate 3.

Furthermore, since the spline teeth 20A of the drive friction plate 3 on the outermost side are fitted into the auxiliary spline grooves 20B', and the spline teeth 20A of the other drive friction plates 3 are fitted into the spline grooves 20B, it is possible to disperse the load acting on the clutch outer member 1 from these drive friction plates 3, thus improving the durability of the clutch outer member 1.

In such a clutch outer member 1, since the reference notches 32 provided on the outer end face of the annular connecting part 31 indicate the positions of the spline grooves 20B, during an assembly process of the clutch C, when the spline teeth 20A of the drive friction plate 3 are fitted into the spline grooves 20B of the clutch outer member 1, making the positions of the spline teeth 20A of the drive friction plate 3 coincide with the positions of the reference notches 32 enables the spline teeth 20A to be appropriately fitted into the spline grooves 20B. It is therefore possible to avoid a misassembly operation being carried out due to being misled by the weight-cutting bottomed grooves 33 of each of the fins 30, thus improving the efficiency of the assembly operation.

In particular, when each of the reference notches 32 is formed so as to communicate with the corresponding spline groove 20B, some of the spline teeth 20A can be guided to the spline grooves 20B through the reference notches 32, thereby further improving the efficiency of the assembly operation.

The present invention is not limited to the above-mentioned embodiment and may be modified in a variety of ways as long as the modifications do not depart from the spirit and scope of the invention. For example, in the first aspect of the present invention, the auxiliary spline groove 20B' of each of the fins 30 is not always necessary, and the spline teeth 20A of all the drive friction plates 3 may be slidably fitted into the spline grooves 20B.

The invention claimed is:

1. A clutch outer member for a multi-plate clutch, the clutch outer member comprising an end wall, a plurality of fins extending axially from an outer peripheral part of the end wall and arranged at equal intervals in a peripheral direction to define spline grooves therebetween, and an annular connecting part formed on an outer periphery at an extremity of the plurality of fins and connecting the plurality of fins integrally to each other, an axially-extending weight-cutting bottomed groove being formed in each fin of the plurality of fins and on an inner peripheral face thereof, wherein the annular connecting part is provided, on a part of an outer end face thereof corresponding to each spline groove, with a reference notch indicating a position of the spline groove, and each bottomed groove terminates at a bottomed auxiliary spline groove configured to open on an extremity face of each fin, the auxiliary spline groove having a width that is greater than a width of the bottomed groove.

2. The clutch outer member for a multi-plate clutch according to claim 1, wherein an inner side face of the reference notch is flush with an inner side face of a corresponding spline groove.

3. The clutch outer member for a multi-plate clutch according to claim 1, wherein a spline tooth of a drive friction plate on an outermost side is slide fitted into the auxiliary spline groove.

4. The clutch outer member for a multi-plate clutch according to claim 1, wherein the annular connecting part extends radially outward from each fin.

5. The clutch outer member for a multi-plate clutch according to claim 1, wherein the auxiliary spline groove has a length smaller than an axial width of the annular connecting part.

6. The clutch outer member for a multi-plate clutch according to claim 1, wherein the auxiliary spline groove has a depth larger than a depth of the bottomed groove.

7. The clutch outer member for a multi-plate clutch according to claim 1, wherein an axial outer end face of the annular connecting part is flush with an axial outer face of each fin.

* * * * *